United States Patent [19]

Zerfahs et al.

[11] 4,094,104

[45] June 13, 1978

[54] FINISHING MACHINE

[75] Inventors: Arthur S. Zerfahs, Elk Grove; Robert J. Jurin, Chicago, both of Ill.

[73] Assignee: Synergetics, Inc., Milwaukee, Wis.

[21] Appl. No.: 730,306

[22] Filed: Oct. 7, 1976

[51] Int. Cl.² .................. B24B 19/14; B24B 41/00
[52] U.S. Cl. .................................. 51/76 R; 51/138;
        51/215 E; 198/344; 269/48.1
[58] Field of Search ............ 51/215 E, 215 M, 145 R,
        51/137, 138, 76 R, 80 A, 110; 29/156.8 P;
        269/48.1; 279/1 Q, 2 R, 2 A; 198/344, 378, 377

[56]         References Cited
         U.S. PATENT DOCUMENTS

| 723,388 | 3/1903 | Hodgson | 198/344 X |
| 2,552,194 | 5/1951 | Lindsay | 198/377 X |
| 2,616,549 | 11/1952 | Ornitz | 198/344 X |
| 3,337,024 | 8/1967 | Gilewski | 198/344 X |
| 3,497,226 | 2/1970 | Hohwart | 279/2 R |

*Primary Examiner*—N. P. Godici

[57]            ABSTRACT

A mechanism for finishing work pieces of the type having a continuously moving conveyor mechanism having work piece holding fixtures movable therewith wherein the work piece is automatically rotated between separate work finishing stations by a gear mechanism actuated by cam mechanisms associated with the conveyor mechanism.

15 Claims, 10 Drawing Figures

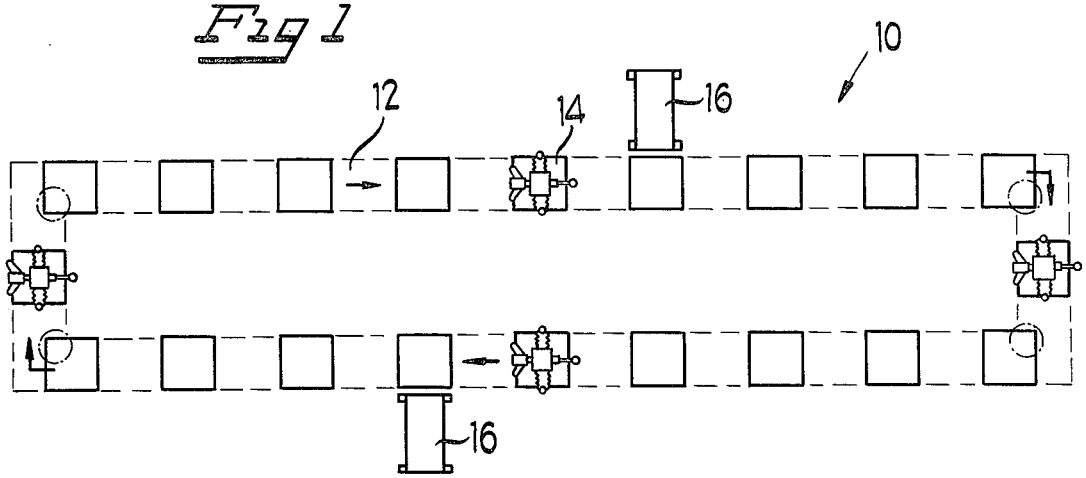
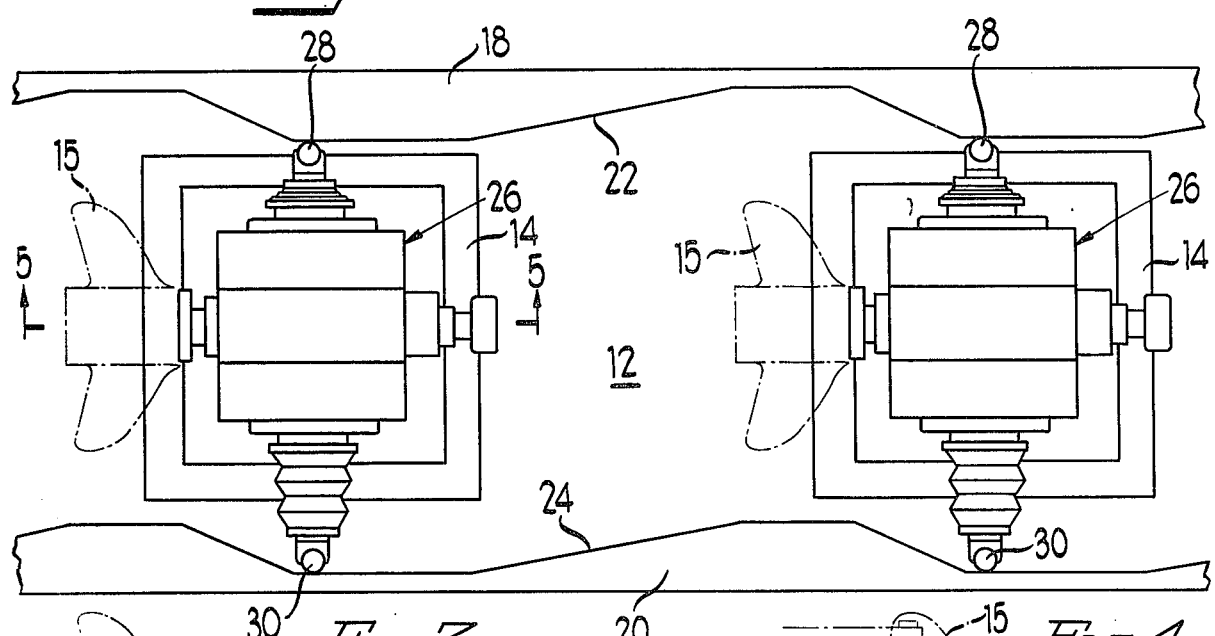
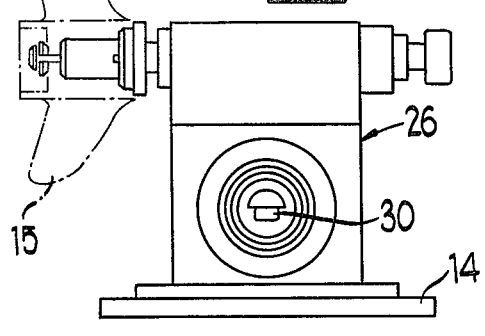
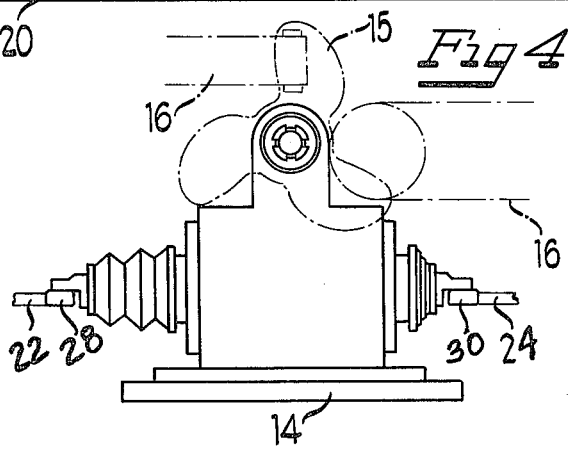

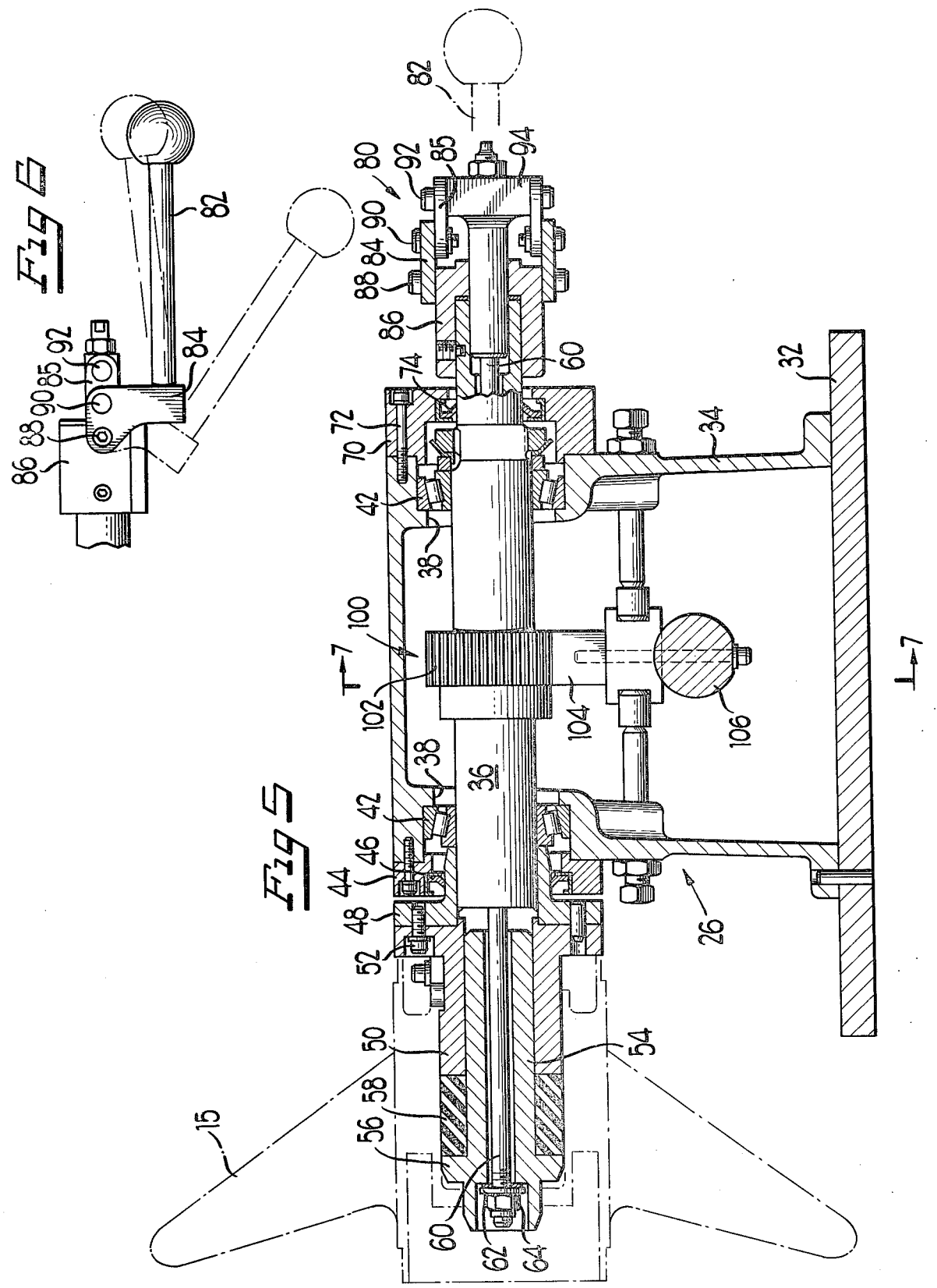

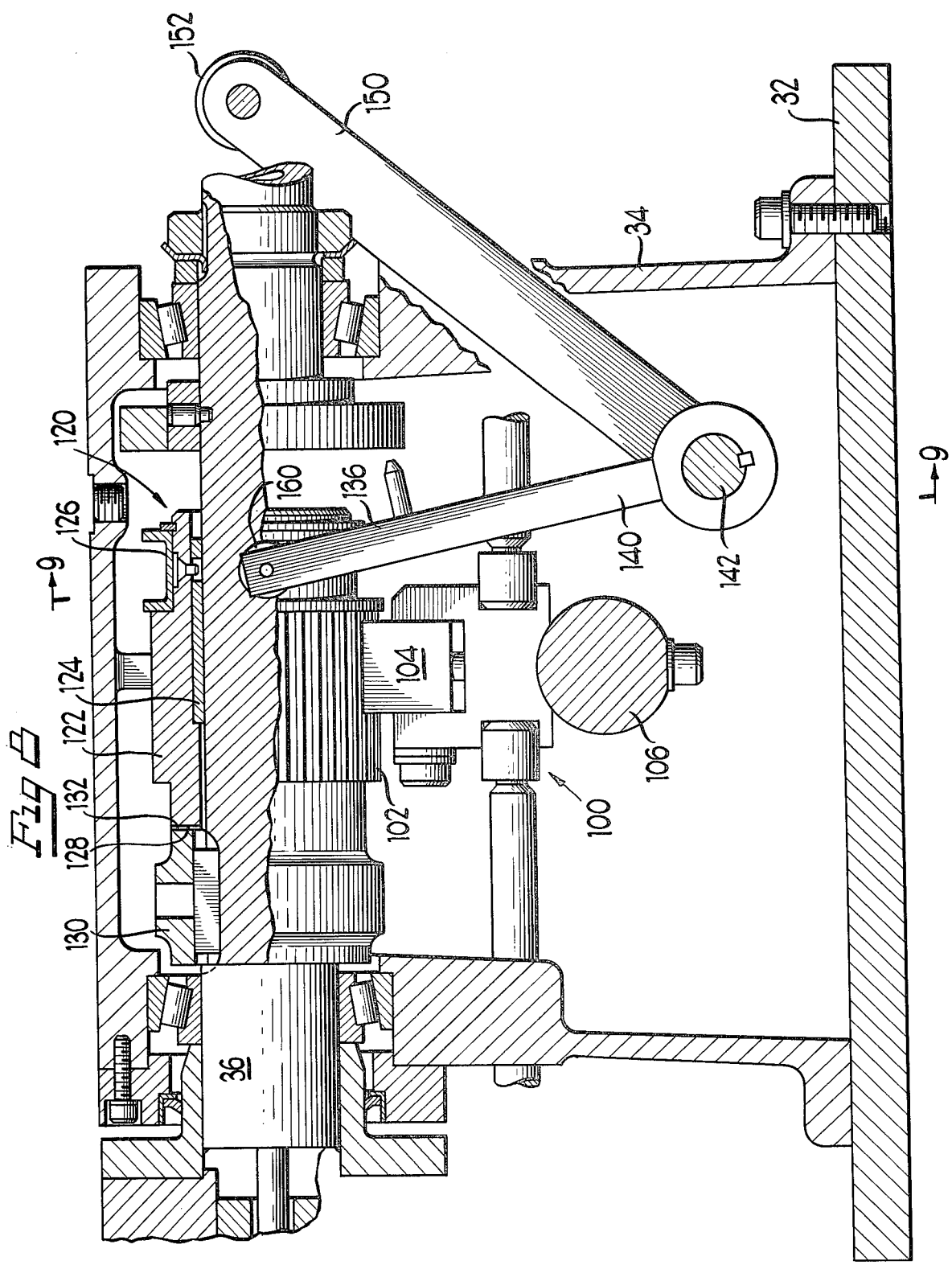

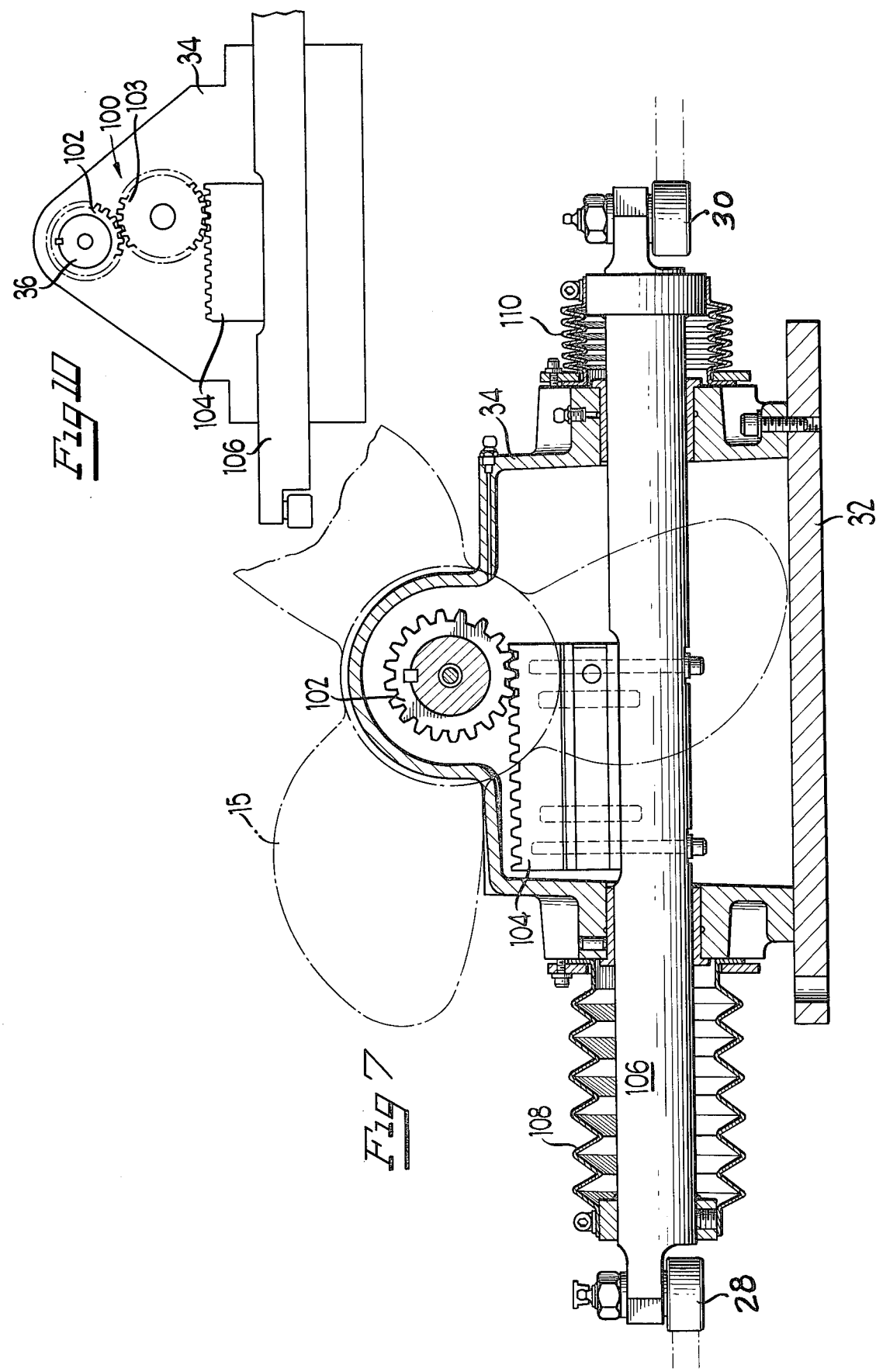

FINISHING MACHINE

SUMMARY OF THE INVENTION

It has been known and recognized that it is highly desirable to have machines for automatically finishing work pieces, that is, sanding and/or like operations, wherein the work pieces are of the type having a simple or a complex configuration such as, for example, a propeller for use in the marine industry and to obviate the necessity for having excessive and multiple manual labor operations involved in the finishing process. This operation has often been done by hand wherein the operator positions or rotates the work piece against a powered moving single sanding wheel or belt as desired in the finishing operation.

Other attempts have been made to devise a single automatic machine that could duplicate and replace the multiple hand finishing process but they have not been successful.

The present invention eliminates the time consuming multiple handling operations, reduces the high labor costs, greatly increases production output, and improves the quality and consistency of the production finishing process. The present invention accomplishes the above by providing a fixture mechanism for use on a continuously moving conveyor which automatically presents and rotates the part between and through finishing operations as desired with a gear machanism operated by a cam mechanism on the conveyor.

BRIEF DESCRIPTION OF THE DRAWINGS

FIG. 1 is a schematic view of a finishing machine of the type described herein;

FIG. 2 is an enlarged top view of the work piece holding fixtures used in the machine of FIG. 1;

FIG. 3 is a side view of the fixture of FIG. 2;

FIG. 4 is a front view of the fixture of FIGS. 2 and 3;

FIG. 5 is a cross-sectional view taken along the lines 5—5 of FIG. 2;

FIG. 6 is an enlarged view of the work piece locking lever mechanism of FIG. 5;

FIG. 7 is a cross-sectional view taken along the lines 7—7 of FIG. 5;

FIG. 8 is a cross-sectional view similar to FIG. 5 showing an optional indexing clutch mechanism;

FIG. 10 is a cross-sectional view similar to FIG. 7 showing an optional variable rotation gear drive mechanism.

DETAILED DESCRIPTION OF THE PREFERRED EMBODIMENT

Figure 9:
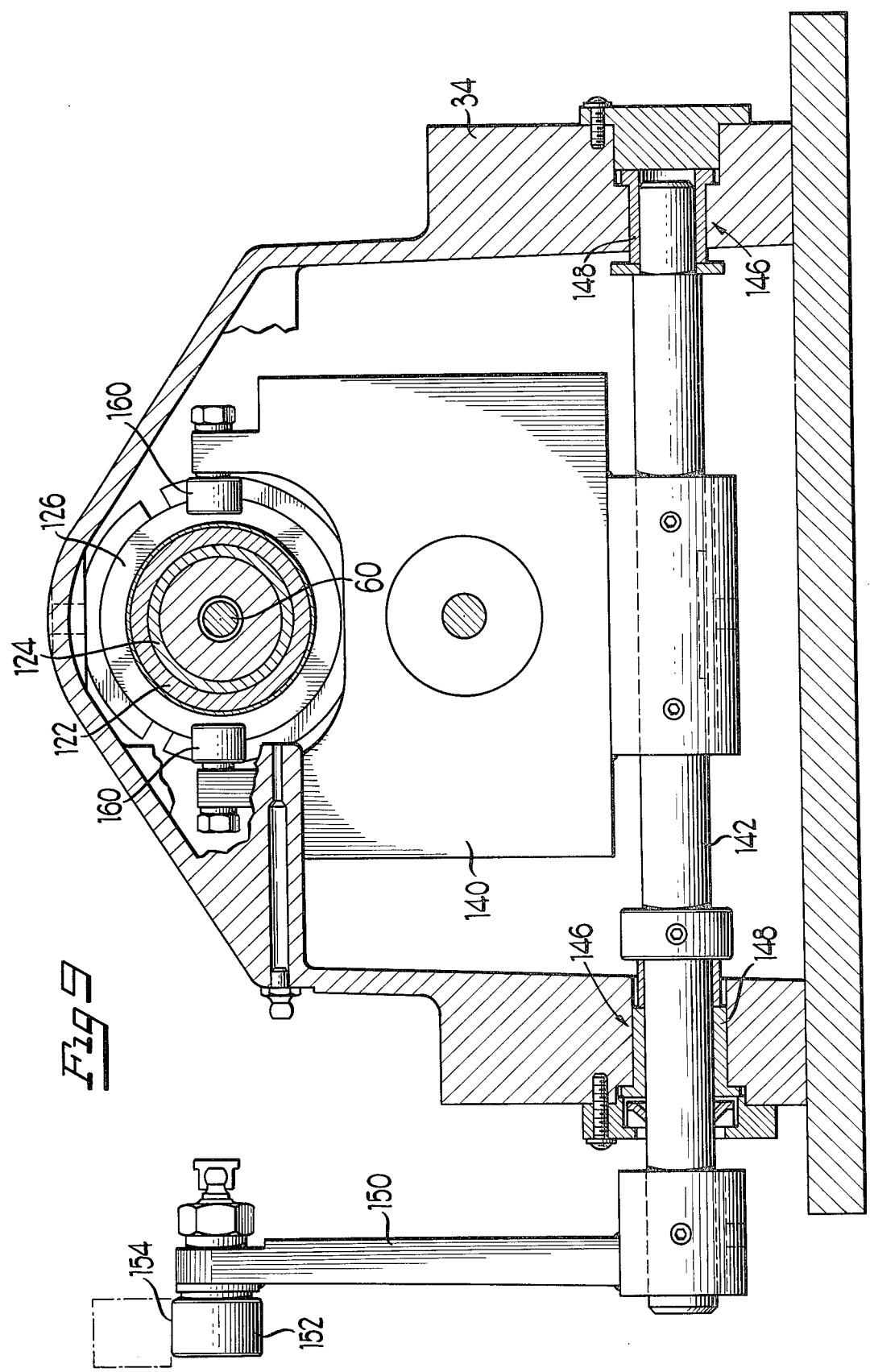
FIG. 9 is a view taken along the lines 9—9 of FIG. 8.

Referring to FIG. 1, a finishing machine 10 is schematically illustrated which has a continuously moving conveyor 12 thereon to which are attached a plurality of work piece fixtures 14 which serve to both hold the work piece as, for example, a propeller 15 in position (FIG. 2), and to rotate the work piece between and at work stations as desired. Also illustrated schematically are sanding or finishing machines 16 which will be disposed from above or the side in a spring-loaded or fixed manner such that as the work piece and fixture traverse in the area of each of the finishing devices 16, they will contact a particular portion of the work piece and may be moved out of the way as the work piece passes that work station. For example, in FIG. 4, a pair of the sanding devices 16 are shown in engagement with the propeller 15.

Referring to FIG. 2, an enlarged view of the conveyor mechanism 12 and a pair of the fixture mechanisms 14 are illustrated and shown. Associated with the conveyor mechanism 12 is a guide mechanism including a pair of side rails 18 and 20. The side rail 18 has a cam track or surface 22 thereon and the side rail 20 has a cam track or surface 24 thereon. Cam surfaces 22 and 24 are preferably vertically oriented to minimize accumulation of dust or grit on the surfaces. The fixture 14 has a work piece holding mechanism 26 thereon, and included therewith are a pair of cam followers 28 and 30 which are in contact with the cams 22 and 24, respectively. The cam followers 28 and 30 comprise rollers as better illustrated in FIG. 4.

As will be apparent, as the fixtures 14 are carried by the conveyor 12 around the machine, rollers 28 and 30 will follow the cams 22 and 24 to operate the work piece rotating mechanism as the cam height changes with respect to the center line of the conveyor mechanism.

Referring to FIG. 5 which is a cross-section through the holding mechanism 26 of the fixture 14, there is shown a base plate 32 for the fixture upon which is mounted a casing 34. Mounted in the casing 34 is a rotatable shaft 36. The shaft 36 passes through a bore 38 formed in the casing 34 which includes bearings 42 in which the shaft 36 can rotate. Enclosing the bore 38 on the left side thereof as illustrated in FIG. 5 is an end cap 44 secured to the casing 34, which has a seal mechanism 46 mounted therein.

The shaft 36 terminates in the area of the end cap 44, but mounted thereon is a drive member 48 to which is attached an arbor mechanism 50 by bolts 52. The arbor 50 is sized to accommodate an internal bore of the work piece 15. Mounted within the arbor 50 is an actuator 54 which has a shoulder 56 thereon. Mounted on the actuator 54 is a rubber or other flexible material collet 58 which is approximately the size of the internal bore of the work piece 15 and which, when deformed as when the actuator 54 would be moved to the right toward collet 50, will expand to tightly engage the internal bore of the work piece 15 and hold it in a selected position. An actuator rod 60 is illustrated which engages with the actuator 54 by means of a washer 62 secured by a nut 64 for moving the actuator 54 when desired. The actuator rod 60 is mounted within the hollow shaft 36 and extends completely through the shaft 36.

It should be noted that although a rubber expanding collet 58 is described above, any of the mechanical expanding collets of known type as used in machine tools could be substituted for collet 58 and such substitution is contemplated herein.

On the right-hand side of the casing 34 as illustrated in FIG. 5 is another end cap 70 secured to the casing as, for example, by bolts 72. End cap 70 has a seal mechanism 74 therein similar to seal mechanism 46 which both serve to keep dirt and other contaminants out of the center compartment of the casing 34.

The rod 60 is moved axially as illustrated in FIG. 5 by a toggle-type handle mechanism 80 which includes a handle 82 and a pair of links 84 and 85. The link 84 is pivoted to a sleeve 86 which is secured to the shaft 36 by a pin 88. A pin 90 pivots the other end of link 84 to one end of link 85. The opposite end of link 85 is connected by a bolt 92 to an end member 94 on the actuator rod 60. The handle 82 is secured in the link 84 as illustrated in FIG. 6.

The handle is shown in FIG. 6 in a full-line position and in a phantom line position. The handle in the full-line position represents the clamp or holding position of actuator rod 60, since when the handle is in the full-line position, the pivots 88, 90 and 92 are in a straight line, as illustrated in FIG. 6, drawing the actuator rod 60 to the right to compress and expand the collet 58 and secure the work piece in position. The aligned position of the pivots illustrated in FIG. 6 also comprises an overcenter position of the link mechanisms, thus automatically locking same in that position. When the operator moves handle 82 to the phantom line position, the construction and geometry of the pivots are such that the actuator rod 60 will be moved to the left, thus allowing the member 58 to return to its undeformed position and release the work piece 15.

A drive means 100 is provided in the fixture 14 for positioning the work piece 15 in predetermined positions at selected times. The drive means includes a gear 102 drivingly connected to the shaft 36. The gear 102 meshes with a rack 104 having teeth thereon meshing with the teeth on the gear 102 forming a drive relationship. Referring to FIG. 7, the rack 104 is secured to a drive rod 106. The drive rod 106 has the followers or rollers 28 and 30 thereon shown also in FIG. 2. A pair of collapsible dust boots 108 and 110 are mounted on each end of the rod 106 and to the casing member 34 to keep dirt and contaminants out of the center compartment of casing 34.

As will be apparent, referring to FIGS. 2 and 7, as the followers 28 and 30 follow the contours of the cam tracks 22 and 24, the rod 106 will move axially of the casing 34 moving rack 104 and thereby rotating gear 102 and work piece 15 thereon. Thus, by providing the cam tracks 22 and 24 in proper relationship, the work piece 15 can be positioned automatically ahead and through each of the work stations to its desired orientation for the work to be done at the particular work station. It should also be noted that only one cam track, 22 for example, may be used by providing a substantial spring load on rod 106 to hold it against a single cam track, to provide a more economical mechanism which should function suitably.

From the above, it will be apparent that the operation of the device is such that at one of the work stations on the machine of FIG. 1, at the completion of the last operation to be performed on the work piece, the operator will move the handle 82 to its released phantom line position to release the finished work piece 15 and remove that work piece and place a new unfinished one on the fixture and move the handle 82 to its clamping position shown in full lines in FIG. 6 to deform collet 58 and securely hold the work piece 15 in position. Referring to FIG. 5 it should be noted that all pieces relating to the clamping mechanism are mounted in the bearings 42 so that they rotate with the work piece when it is rotated, thus the clamping force on the work piece is maintained.

As the fixture moves along the conveyor 12 in a continuous manner, the cams 22 and 24 on either side of the conveyor act on the followers 28 and 30 to move the rod 106 and thereby rack 104 and gear 102 to control the orientation of the work piece 15 and to change the orientation thereof as desired as the fixture moves around the machine. Thus, the work piece 15 is automatically positioned between and through the work stations without the necessity of any manual labor or slowdown to reorient the work piece.

Referring to FIGS. 8 and 9, an optional indexing clutch mechanism is illustrated which may be utilized to provide a means by which the drive train 100 may be disabled and indexed at desired times. The indexing mechanism may be used, for example, when finishing a three-bladed propeller and to finish each blade of the propeller, it must pass through the machine three times. The mechanism of FIGS. 8 and 9 provides a clutch which will be automatically disengaged so that the orientation of the drive train described above with respect to the work piece may be changed by cams 22 and 24 operating to move rod 106 just after the mechanism of FIGS. 8 and 9 disables the drive train. By this means after each pass through the machine the work piece can be reoriented a desired number of degrees, which in the case of the three-bladed propeller would be 120 degrees. The drive mechanism 100 in this embodiment is generally similar to the construction of the drive mechanism of FIG. 5. Referring particularly to FIG. 8, a clutch mechanism 120 is provided including a movable and rotatable sleeve 122 mounted on the shaft 36 and rotatable thereon by means of a cylindrical bearing 124. The sleeve 122 has a groove 126 formed therein. On the left end of the sleeve 122 are formed a series of clutch teeth 128 as viewed in FIG. 8. The sleeve 122 has in the FIG. 8 embodiment the gear 102 formed thereon. Drivingly connected to the shaft 36 is a coupling member 130 which has teeth 132 on the right end thereof which are adapted to mesh and engage with the teeth 128. Thus, when the sleeve 122 is in the position illustrated in FIG. 8, teeth 128 and 132 are in mesh and movement of the rack 104 to rotate sleeve 122 will rotate the shaft 36 and change the orientation of the work piece 15. The sleeve 122 and gear 102 are axially slidable on the shaft 36 by a lever mechanism 136.

The lever mechanism 136 includes a large plate or lever 140 attached to a rotatable shaft 142 as viewed in FIGS. 8 and 9. The shaft 142 is mounted within bores 146 in the casing 34 on either side thereof and suitable bearings 148 are provided mounting the shaft for rotation within the casing 34. Also fixed on the shaft 142 is an actuating lever 150 which is drivingly connected to shaft 142. The actuating lever 150 has a cam follower or roller 152 rotatably mounted on the upper end thereof as viewed in FIGS. 8 and 9. The roller or follower 152 engages a fixed cam track 154 which may be provided along the side of the conveyor mechanism adjacent or nearby to cam 22. The cam track 154 is disposed within a horizontal plane and has a rise and fall characteristic such as to rotate the lever 150 clockwise and/or counterclockwise with respect to the shaft 142 as viewed in FIG. 8.

Provided on the lever of plate 140 are a pair of roller mechanisms 160 which are engaged within the groove 126 of the sleeve 122. Thus, as will be apparent, when the cam track 154 changes its height, the roller 152 following same will move the lever 150 which will rotate shaft 142, which will rotate the lever 140 in a corresponding manner to shift the sleeve 122 into its engaged position as shown in FIG. 8 or to a released position which would be to the right as viewed in FIG. 8.

The advantage of the clutch mechanism shown and described with respect to FIGS. 8 and 9 is that by use of the lever mechanism 136, the drive means 100 can be disabled so that the cams 22 or 24 may be operative to change the orientation of the work piece with respect to drive means 100 in a selected area of the machine 10 due to the second cam track 154 actuating lever mechanism 136 to release the drive connection. Thus, a great amount of flexibility is provided in the mechanism by having a clutchable drive connection to the work piece orienting mechanism to index or reposition the work piece 15 as desired.

Referring to FIG. 10, an optional form of drive mechanism 100 is illustrated wherein an additional gear 103 is interposed between gear 102 and rack 104. By the use of an intermediate gear 103, some flexibility is provided in the drive train in that by using gears 103 with different members of teeth thereon, the speed or amount of rotation of work piece 15 may be varied.

As described above, provision is made for an operator to actuate mechanism 80 to release collet 58 and remove work piece 15. However, it will be apparent to those of ordinary skill in the art that automatic mechanism by means of cams or otherwise can be provided to actuate collet 58 at the desired time and in conjunction with suitable mechanism such as a chute and a moving arm to push the work piece 15 off the collet 58, automatically unloading of the finished work piece 15 can be accomplished. Also, mechanism can be provided to automatically position an unfinished work piece 15 or collet 58 at the proper time. Thus it will be apparent to those of ordinary skill in the art that with the basic and unique structure described herein, with exercise of ordinary skill, the machine of this invention may be provided with automatic loading and unloading features.

We claim:

1. A finishing machine having a plurality of work stations including a continuously moving conveyor mechanism, a plurality of work piece fixtures traveling with said conveyor, each fixture having rotatable means holding a work piece, drive means in each fixture adapted to rotate said rotatable means to position the work piece for said work stations, said drive means including a follower mechanism translationally moveable with respect to said rotatable means in a direction transverse to the direction of movement of said conveyor, said machine including stationary guide means near said conveyor contactable against said follower mechanism whereby said guide means will cause translational movement of said follower mechanism with respect to said rotatable means and will actuate said drive means to position the work piece as the fixture travels on the conveyor.

2. A machine as claimed in claim 1, wherein said guide means includes a cam track on either side of said conveyor and said follower mechanism being in contact with each of said tracks.

3. A finishing machine having a plurality of work stations including a continuously moving conveyor mechanism, a plurality of work piece fixtures traveling with said conveyor, each fixture having rotatable means holding a work piece, drive means in each fixture adapted to rotate said rotatable means to position the work piece for said work stations, said machine including stationary guide means near said conveyor in contact with said drive means whereby said guide means will actuate said drive means to position the work piece as the fixture travels on the conveyor, said drive means including a gear on said rotatable means and a gear rack in mesh therewith and movable with respect thereto, said guide means moving said rack as said fixture travels on the conveyor.

4. A finishing machine having a plurality of work stations including a continuously moving conveyor mechanism, a plurality of work piece fixtures traveling with said conveyor, each fixture having a rotatable holding means for holding a work piece, drive means in each fixture adapted to rotate said rotatable means to automatically position the work piece for said stations, said drive means including a follower mechanism translationally movable with respect to said rotatable means in a direction transverse to the direction of movement of the conveyor, said machine including stationary cam means adjacent to said conveyor in contact with said follower mechanism, said cam means operative to cause translational movement of said follower mechanism with respect to said rotatable means to position the work piece as the fixture travels on the conveyor, said rotatable means being received in a bore in the work piece, a flexible member on said holding means, an actuator in said holding means movable to deform said flexible member and thus securely hold said work piece.

5. A machine as claimed in claim 4, including a clamp mechanism manually or automatically operative to move said actuator for deforming said flexible member.

6. A finishing machine having a plurality of work stations including a continuously moving mechanism, a plurality of work piece fixtures traveling with said conveyor, each fixture having a rotatable holding means holding a work piece, drive means in each fixture adapted to rotate said rotatable means to position the work piece for said work stations, said machine including stationary cam means adjacent to said conveyor in contact with said drive means, said cam means operative to actuate said drive means to position the work piece to selected positions as the fixture travels on the conveyor, a positive clutch mechanism on said holding means engageable to disable said drive means at selected positions on said machine.

7. A machine as claimed in claim 6, including an actuator for said clutch mechanism, second cam means adjacent to said conveyor, follower means on said actuator in contact with said second cam means for automatically engaging and releasing said clutch.

8. A machine as claimed in claim 7, said stationary cam means including cam track on either side of said conveyor and a follower mechanism in said fixture in contact with each of said tracks.

9. A finishing machine for marine propellers having a plurality of work stations including a continuously moving conveyor mechanism, a plurality of work piece fixtures traveling with said conveyor, each fixture having a rotatable holding means for holding a propeller, drive means in each fixture adapted to rotate said rotatable means to automatically position the propeller for said work stations, said drive means including a follower mechanism translationally movable with respect to said rotatable means in a direction transverse to the direction of movement of the conveyor, said machine including stationary cam means adjacent to said conveyor, in contact with said follower mechanism, said cam means operative to cause translational movement of said follower mechanism with respect to said rotatable means to position the propeller as the fixture travels on the conveyor, said rotatable means being received in a bore in the propeller, a flexible member on said holding means, an actuator in said holding means movable to deform said flexible member and thus securely hold said propeller.

10. A machine as claimed in claim 9, wherein said cam means includes a cam track on either side of said conveyor and said follower mechanism being in contact with each of said tracks.

11. A machine as claimed in claim 9, including a clamp mechanism operative to move said actuator for deforming said flexible member.

12. A finishing machine for marine propellers having a plurality of work stations including a continuously moving conveyor mechanism, a plurality of fixtures traveling with said conveyor, each fixture having a rotatable holding means for holding a propeller, drive means in each fixture adapted to rotate said rotatable means to automatically position the propeller for said work stations, said drive means including a follower mechanism translationally movable with respect to said rotatable means in a direction transverse to the direction of movement of the conveyor, said machine including stationary cam means adjacent to said conveyor in contact with said follower mechanism, said cam means operative to cause translational movement of said follower mechanism with respect to said rotatable means to position the propeller as the fixture travels on the conveyor, said rotatable means being received in a bore in the propeller, a flexible member on said holding means, an actuator in said holding means movable to deform said flexible member and thus securely hold said propeller, and means for connecting said follower mechanism and said rotatable means including a replaceable gear replaceable to vary the characteristics of rotation of said propeller by said drive means.

13. A machine as claimed in claim 12, wherein said cam means includes a cam track on either side of said conveyor and said follower mechanism being in contact with each of said tracks.

14. A finishing machine having a plurality of work stations and including a moving conveyor mechanism, at least one work piece fixture connected to said conveyor and movable with said conveyor, said fixture having rotatable means holding a work piece and drive means for selectively rotating said rotatable means to position the work piece at said work stations, said drive means including a follower mechanism translationally movable with respect to said rotatable means in a direction transverse to the direction of movement of the conveyor, and said machine including guide means adjacent said conveyor for moving said follower mechanism translationally with respect to said rotatable means for rotating said rotatable means to position the work piece as the fixture travels on the conveyor.

15. A finishing machine having a plurality of work stations including a movable conveyor mechanism, means for moving the conveyor mechanism, at least one work piece fixture movable with said conveyor and having a rotatable holding means for holding a work piece, and said fixture having drive means for rotating said rotatable means to position the work piece for said work stations, and said machine including cam means adjacent to said conveyor and in contact with said drive means for actuating said drive means to position the work piece to selected positions as the fixture travels on the conveyor and said rotatable holding means including a positive clutch mechanism engageable to disable said drive means at selected positions on said machine.

* * * * *

UNITED STATES PATENT OFFICE
CERTIFICATE OF CORRECTION

Patent No. 4,094,104      Dated June 13, 1978

Inventor(s) Arthur S. Zerfahs and Robert J. Jurin

It is certified that error appears in the above-identified patent and that said Letters Patent are hereby corrected as shown below:

Column 6, line 7, after the word "said", insert --work--.

Column 6, line 25, after the word "moving", insert --conveyor--.

Signed and Sealed this

Twelfth Day of December 1978

[SEAL]

Attest:

RUTH C. MASON
Attesting Officer

DONALD W. BANNER
Commissioner of Patents and Trademarks